United States Patent [19]
Mileski et al.

[11] Patent Number: 5,521,376
[45] Date of Patent: May 28, 1996

[54] OPTICAL MOTION SENSOR FOR AN UNDERWATER OBJECT

[75] Inventors: Paul M. Mileski, Mystic; Roger L. Morency, Voluntown, both of Conn.

[73] Assignee: The United States of America as represented by the Secretary of the Navy, Washington, D.C.

[21] Appl. No.: 230,460

[22] Filed: Apr. 20, 1994

[51] Int. Cl.$^6$ ............................................. H01J 5/02
[52] U.S. Cl. ........................... 250/239; 350/574; 356/442
[58] Field of Search .................................. 250/239, 577, 250/227.32, 227.29, 574; 73/620, 621, 644, 587, 865.8; 356/417, 418, 441–442, 336–338

[56] References Cited

U.S. PATENT DOCUMENTS

| | | | |
|---|---|---|---|
| 4,293,225 | 10/1981 | Wheaton et al. | 356/417 |
| 4,399,703 | 8/1983 | Matzuk | 73/621 |
| 4,950,908 | 8/1990 | Oblad et al. | 250/574 |
| 4,972,070 | 11/1990 | Laverty, Jr. | 250/239 |

Primary Examiner—Stephone Allen
Assistant Examiner—Que T. Le
Attorney, Agent, or Firm—Michael J. McGowan; Prithvi C. Lall; Michael F. Oglo

[57] ABSTRACT

A system for sensing motion of an object in an underwater environment is provided. The system has a circuit board, a light-emitting diode, an infrared filter, an integrated circuit, and an acrylic transparent housing. The light-emitting diode and the integrated circuit are mounted on the circuit board. The integrated circuit has a photoelectric transducer and a low-noise amplifier. The housing surrounds and seals the diode, the filter, the integrated circuit, and the board from exposure to the underwater environment. The housing also provides a convex lens on one end which corresponds with the direction in which the diode emits infrared radiation. The convex lens spreads the radiation emitted from the diode. The emitted radiation approaches and reflects back from the moving object. The convex lens also spreads this reflected radiation. The infrared filter screens unwanted radiation. The photoelectric transducer converts the filtered radiation into an electrical signal which the low-noise amplifier amplifies. The output of the amplifier is then recorded and correlated to the motion of the object underwater.

20 Claims, 3 Drawing Sheets

5,521,376

OPTICAL MOTION SENSOR FOR AN UNDERWATER OBJECT

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

1. Field of the Invention

The present invention relates generally to optical motion sensors and more specifically to an optical motion sensor for an underwater object.

2. Description of the Prior Art

Detecting the motion of an object as it travels underwater presents difficulties not encountered by instrumentation used in dry environments. These difficulties include protecting the electrical components of the sensing instrumentation from exposure to water and from the extreme changes in pressurization which occur in underwater environments.

The changes in pressurization occur, for example, when an object such as a submarine buoy is launched within the launching barrel of a submarine. As the buoy exits, it exerts tremendous pressure on the sidewalls of the barrels. This pressure can easily damage any instrumentation which is located in the sidewalls of the barrel and which is measuring the exit velocity and acceleration of the buoy.

The instrumentation available among the prior art includes optical motion sensors used in dry environments. For example, U.S. Pat. No. 4,880,966 by Goodrich et al. discloses an optical tachometer sensor for providing an output related to the rotational speed of a rotor shaft of a helicopter. The sensor illuminates a reflective mark on the rotor shaft, with modulated light and focuses this light via a receiving lens arrangement onto a photoelectric sensor. The sensor then provides signals to a conditioning circuitry for controlling output.

U.S. Pat. No. 4,866,269 by Wlodarczyk et al., on the other hand, discloses a fiber-optic detector which senses a light reflective or transmissive pattern of an encoder disk mounted on a cam shaft of an automotive engine. The detector has a sensing head which includes a pair of optical fibers coupled to a light-emitting diode (LED) and a photodiode detector. The LED provides light to the detector head which illuminates a spot on the encoder disk. One of the optical fibers transmits the light to the detector where the received light intensity is translated into an output voltage.

The instrumentation available among the prior art also includes sensors which are non-linear and have a slow response time. As a result, these sensors have low sensitivity and thereby demand accurate positioning at the detecting site. There is thus a need for a sensor which overcomes the above-mentioned problems in the prior art devices.

SUMMARY OF THE INVENTION

Accordingly, an object of the present invention is to detect motion optically in an underwater environment.

Another object of the present invention is to detect motion of underwater objects with a device which withstands the high pressurization of an underwater environment.

A further object of the present invention is to detect motion optically in an underwater environment without precise positioning of a detecting device.

The present invention attains the foregoing and additional objects by providing an apparatus for sensing motion of an object in an underwater environment. The apparatus comprises a circuit board for mounting a group of electrical components, means for emitting infrared radiation onto the underwater object, means for filtering unwanted light (non-infrared light), means for transducing the reflected radiation into an electrical signal and then amplifying this electrical signal, and means for surrounding the circuit board and the group of electrical components mounted on the circuit board.

In the preferred embodiment, the circuit board is circular in shape and is made of fiberglass-epoxy. The board is also finely perforated. The means for emitting is preferably a light-emitting diode (LED) mounted onto the circuit board, while the means for transducing and amplifying is an integrated circuit having an infrared bandpass filter, a photoelectric transducer and a low-noise amplifier. The LED has a convex lens for spreading the infrared radiation at its point of emission. The infrared filter connects to the detecting surface of the integrated circuit. The integrated circuit connects to a socket which in turn connects to the circuit board.

The means for surrounding provides a housing and is preferably made of a transparent material such as an acrylic plastic. The means for surrounding forms a convex lens on one end for spreading the emitted infrared radiation. The LED is located within the means for surrounding at a position having a distance from the convex lens which is farther than the distance between the convex lens and the integrated circuit. In other words, the LED is behind the integrated circuit relative to the end with the convex lens. The means for surrounding also provides a seal against the underwater environment for the electrical components of this invention. Other electrical components used in the preferred embodiment include a resistor connected in series with the LED for adjusting the LED's power and a feedback resistor connected in parallel with the low-noise amplifier for adjusting the gain of the amplifier.

BRIEF DESCRIPTION OF THE DRAWINGS

The foregoing objects and other advantages of the present invention will be more fully understood from the following detailed description and reference to the appended drawings wherein.

DESCRIPTION OF THE PREFERRED EMBODIMENT

Figure 1:
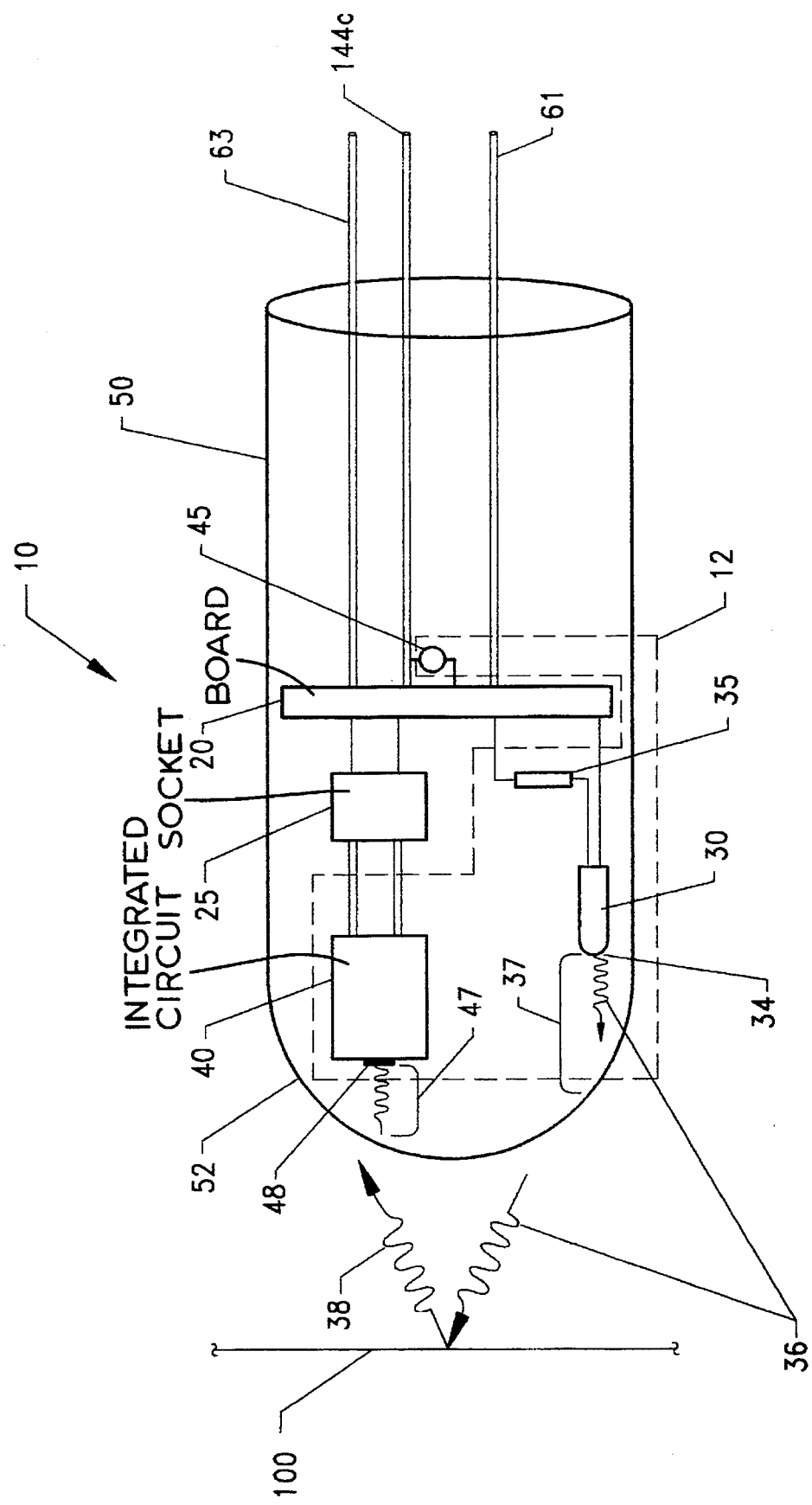
FIG. 1 is a side view of an optical motion sensor of the present invention.

FIG. 1 shows a side view of an optical motion sensor for an underwater object, referred to generally by the numeral 10. It should be noted that like numerals will be used to designate like parts throughout the various figures of the drawings. The sensor 10 comprises a circuit board 20 for mounting a group of electrical components 12, means for emitting infrared radiation or light-emitting diode (LED) 30, means for transducing and amplifying or an integrated circuit 40, means for filtering out non-infrared light or infrared optic filter 48, and means for surrounding the circuit board and the group of electrical components or housing 50. The group of electrical components 12 which are mounted on the circuit board 20 includes the LED 30, a power-adjusting resistor 35, and the integrated circuit 40 which includes a feedback resistor 45. Three electrical leads indicated as numerals 61, 63, and 144c are shown in FIG. 1 for reference only and are more fully described in the discussion of FIG. 3. In the preferred embodiment, the circuit board 20 further comprises a socket 25 which is both physically and electrically connected to the board 20. The socket 25 receives the integrated circuit 40 and thereby electrically connects the integrated circuit 40 to the board 20. The socket 25 advantageously positions the integrated circuit 40.

The LED 30 has a convex lens 34 on one end and is located within the housing 50 at a position having a distance 37 from the end of a second convex lens 52. Distance 37 is greater than the space 47 between the second convex lens 52 and the integrated circuit 40. In other words, the LED 30, relative to the end with the convex lens, mounts to the circuit board 20 behind the integrated circuit 42. This positioning provides particularly favorable results.

Figure 2:
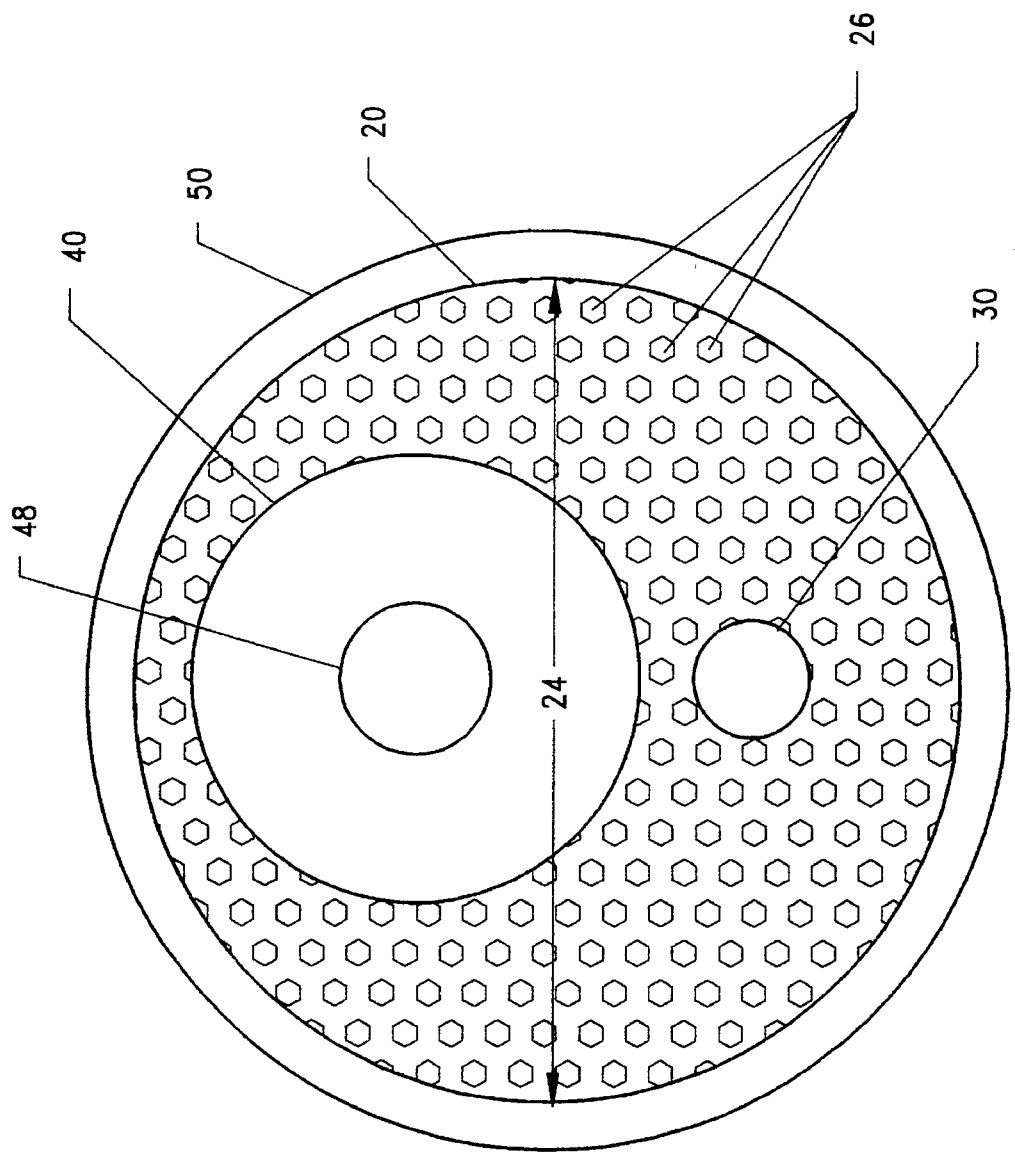
FIG. 2 is a front view of the optical motion sensor of the present invention.

As illustrated in FIG. 2, the circuit board 20 has a circular shape with a diameter 24 which is preferably 0.375 inches. The circuit board 20 also has a group of fine perforations 26 which enable fine electrical wiring to pass through the board. The circuit board 20 is made of a fiberglass-epoxy which provides sturdy construction and effective separation of noise between electrical components. The LED 30 and the housing 50 are shown in FIG. 2 for reference.

Referring now to FIGS. 1 and 2, the infrared optic filter 48 connects to the integrated circuit 40. The filter 48 is preferably a thin piece of plastic which is readily available commercially. The filter 48 is glued or placed on the detecting surface of the integrated circuit 40 as shown in FIGS. 1 and 2. The optic filter 48 prevents underwater ambient light, mostly green in color, from generating excess electrical noise around the circuit.

Figure 3:
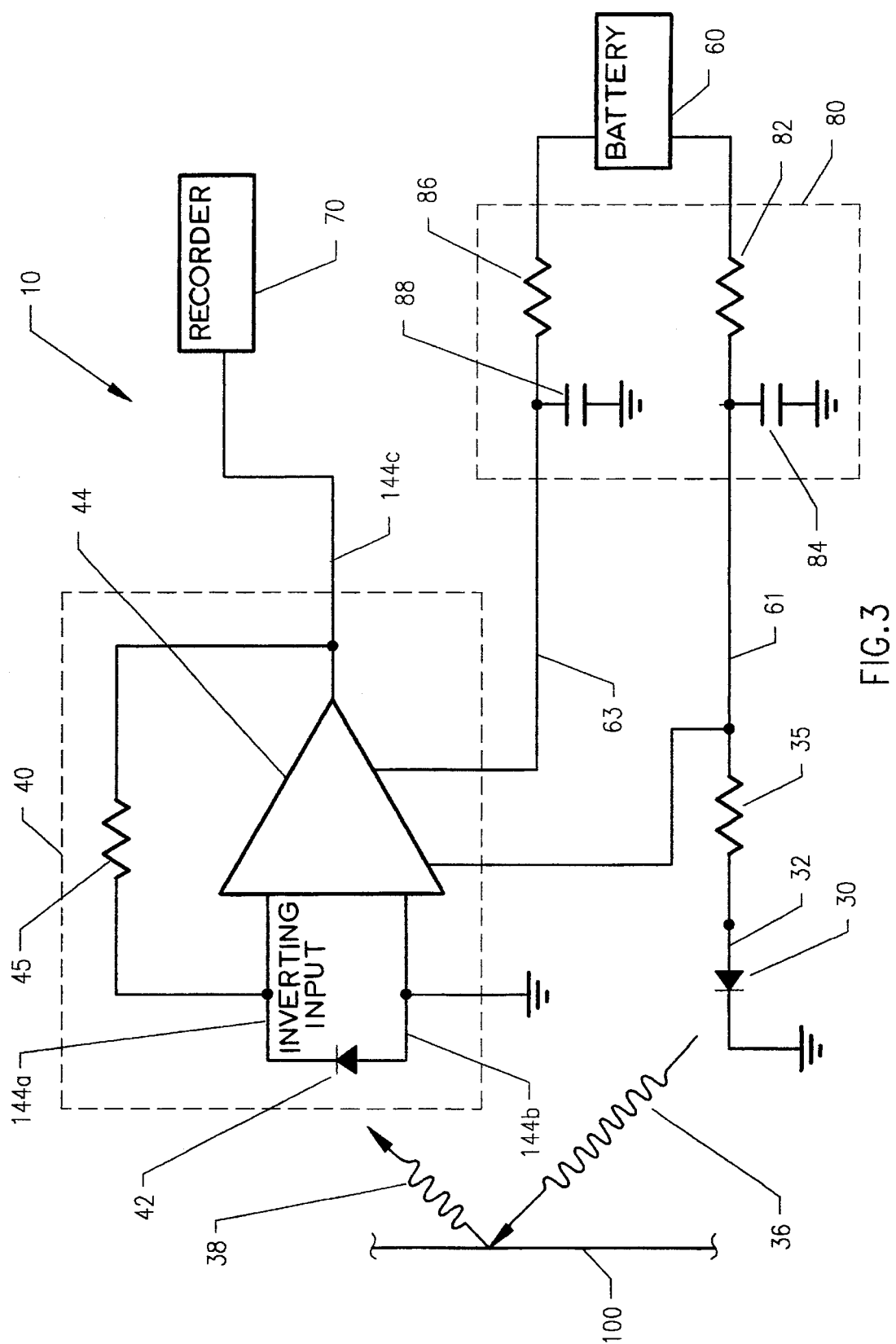
FIG. 3 is a schematic diagram of the electrical system of the present invention.

Referring now to FIG. 3, a schematic diagram represents the electrical arrangement of the sensor 10 of the present invention. Preferably, the arrangement begins with a means for generating and supplying electrical energy or battery 60. The battery 60 supplies a direct current voltage through a positive voltage supply line 61 which connects in series to the power-adjusting resistor 35. The resistor 35 is not essential to sensor 10 but does improve overall performance. The resistor 35 connects in series with the input 32 of the LED and adjusts the output power of the LED. The output of the LED 30 is connected to a ground. The LED 30 emits infrared radiation 36.

The electrical arrangement further includes the integrated circuit 40 which comprises a photoelectric transducer 42, a low-noise amplifier 44, and a feedback resistor 45. An example of such an integrated circuit is the commercially-available EG&G HUV 1100. The resistor 45 is not essential to circuit 40 but does improve overall performance.

The transducer 42 has its input connected to a ground and its output connected to an inverting input 144a of the low-noise amplifier 44. The transducer 42 electrically connects in parallel with the inverting input 144a and an input 144b of the low-noise amplifier 44. The low-noise amplifier 44 receives its electrical energy from the positive voltage supply line 61, while the feedback resistor 45 connects with the inverting input 144a and an output 144c of the low-noise amplifier 44. The feedback resistor 45 determines the gain and thereby the sensitivity of the low-noise amplifier. A resistivity of four-hundred twenty kilohms performed particularly well in the preferred embodiment.

The output 144c of the amplifier connects in series preferably to a recorder 70 which records the amplified electrical signal. Also, the negative voltage supply line 63 connects the low-noise amplifier 44 with the negative power supply of the battery 60.

Because the sensor 10 operates in an underwater environment, the battery 60 tends to interact with the water and present peculiar noise-generating problems. As a result, the preferred embodiment includes a means for reducing noise 80 which comprises a noise-reducing resistor 82 connected in series with the positive voltage supply line 61 and a noise-reducing capacitor 84 connected across the same supply line. The means for reducing noise 80 further comprises a second noise-reducing resistor 86 connected in series with the negative voltage supply line 63 and a second noise-reducing capacitor 88 connected across this same negative supply line. The means for reducing noise 80 acts to decouple the battery and thereby reduce any noise from the battery as it interacts with the water.

Referring back to FIG. 1, the convex lens 34 spreads the infrared radiation 36 which the LED emits. The emitted infrared radiation 36 eventually reaches an underwater object 100. The underwater object 100 in the preferred embodiment is a submarine signal buoy striped with a group of highly-reflective annular surfaces. The highly-reflective annular surfaces should be uniformly-sized. Silver paint, for example, provides such a surface. Other underwater objects, however, would also work acceptably well so long as they reflected infrared radiation. Examples of such other underwater objects would include the bubbles of air created by an underwater vehicle or the vehicle's propeller as either travels through the water, as well as bubbles created at or near the surface of a high level acoustic source due to cavitation.

After the emitted infrared radiation 36 reaches underwater object 100, it reflects back as reflected radiation 38 through the second convex lens 52 and then through the optic infrared filter 48 to the detecting surface of the integrated circuit 40. As illustrated in FIG. 3, the photoelectric transducer 42 receives the radiation 38 reflecting off object 100 and converts it into an electrical signal which the low-noise amplifier 44 in turn amplifies. The output of the amplifier is sent to the recorder 70 for recording the detected radiation.

Referring back to FIG. 1, the housing 50 provides advantageous and unique features to the present invention. The housing 50 is preferably made of a transparent material such as an acrylic plastic and forms the second convex lens 52 which resembles the shape of a test tube. The second convex lens 52 combines with the convex lens 34 of the LED to spread the emitted infrared radiation 36. The second convex lens 52, however, also spreads the reflected radiation 38 to enhance the detection of the photoelectric transducer. This spreading characteristic eliminates the need of precisely locating the sensor 10 relative to the underwater object being sensed. The housing 50 also provides a water-tight seal for the circuit board 20 and the group of electrical components 12. The process by which the housing provides this seal simply involves surrounding all of the electrical components and the circuit board with a molten, transparent plastic material. The material hardens and results in both a hermetic and water-tight seal. This seal also withstands exposure to the higher pressures which occur underwater or in the launching barrel of a submarine. The housing thus protects the instrumentation of the present invention against its most prevalent environment. The novel features of this invention include a transducer which detects infrared radiation from an underwater object, a filter for removing unwanted ambient light, and a housing made of a transparent, plastic material which spreads both emitted radiation from the LED and reflected radiation to the detector. The housing also protects electrical components such as the LED, the integrated circuit, and the resistors of the present invention from exposure to the underwater environment. The benefits of this invention include the ability to detect the motion of an underwater object using infrared radiation with a sturdy device which can operate in an underwater environment and which can withstand the high pressures which occur in such an environment. The present invention also provides a highly-sensitive motion sensor without requiring precise positioning during its application.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An apparatus for sensing motion of reflective objects in an underwater environment comprising:

means for mounting a plurality of electrical components;

means, mounted to said means for mounting, for emitting infrared radiation onto the reflective object;

means, mounted to said means for mounting, for filtering and transducing the emitted infrared radiation reflecting back from the reflective object into an electrical signal, said means for transducing also amplifying the electrical signal; and means, made of a transparent material, for surrounding said means for mounting and the plurality of electrical components mounted on said means for mounting, said means for surrounding also including spreading emitted infrared radiation.

2. An apparatus for sensing motion of a reflective object in an underwater environment as recited in claim 1 wherein said means for mounting further comprises a water and pressure-resistant circuit board.

3. An apparatus for sensing motion of a reflective object in an underwater environment as recited in claim 2 wherein the circuit board is circular in shape.

4. An apparatus for sensing motion of a reflective object in an underwater environment as recited in claim 3 wherein the circular circuit board has a diameter of 0.375 inches.

5. An apparatus for sensing motion of a reflective object an underwater environment as recited in claim 2 wherein the circuit board is made of a fiberglass-epoxy material.

6. An apparatus for sensing motion of a reflective object in an underwater environment as recited in claim 2 wherein the circuit board is finely perforated.

7. An apparatus for sensing motion of a reflective object in an underwater environment as recited in claim 1 wherein said means for emitting is an infrared light-emitting diode.

8. An apparatus for sensing motion of a reflective object in an underwater environment as recited in claim 7 wherein the light-emitting diode includes a convex lens on one end for spreading the emitted infrared radiation.

9. An apparatus for sensing motion of a reflective object in an underwater environment as recited in claim 1 wherein said means for filtering and transducing the emitted infrared radiation comprises an integrated circuit.

10. An apparatus for sensing motion of a reflective object in an underwater environment as recited in claim 9 wherein the integrated circuit includes a photoelectric transducer and a low-noise amplifier.

11. An apparatus for sensing motion of a reflective object in an underwater environment as recited in claim 9 wherein said filtering means comprises an optical filter connected to the integrated circuit of said transducing and amplifying means.

12. An apparatus for sensing motion of a reflective object in an underwater environment as recited in claim 1 wherein said means for surrounding said means for mounting and the plurality of electrical components therein further provides a water-tight seal.

13. An apparatus for sensing motion of a reflective object in an underwater environment as recited in claim 11 wherein said means for surrounding is in the shape of a test tube.

14. An apparatus for sensing motion of a reflective object in an underwater environment as recited in claim 1 wherein said means for surrounding comprises a solid acrylic plastic mass in which said means for mounting and the plurality of electrical components mounted on said means for mounting are suspended.

15. An apparatus for sensing motion of a reflective object in an underwater environment as recited in claim 2 wherein said means for mounting further comprises a socket, electrically and mechanically connected to the circuit board, for receiving said means for filtering, transducing, and amplifying.

16. An apparatus for sensing motion of a reflective object in an underwater environment as recited in claim 11 wherein said means for emitting infrared radiation is positioned within said means for surrounding at a location having a distance from the convex lens which is greater than the distance between the convex lens and said means for filtering and transducing.

17. An apparatus for sensing motion of a reflective object in an underwater environment as recited in claim 10 further comprising a feedback resistor connected in parallel with the low-noise amplifier of the integrated circuit.

18. An apparatus for sensing motion of a reflective object in an underwater environment as recited in claim 1, further comprising:

means, connected in series with the output of said means for filtering, transducing, and amplifying, for recording the amplified electric signal;

means, connected in series to said means for emitting and to said means for transducing and amplifying, for generating and supplying electrical energy to the apparatus, said means for generating and supplying having a positive voltage supply line and a negative voltage supply line; and means connected in series with the input of said means for emitting, adjusting and conditioning the power of said means for emitting.

19. An apparatus for sensing motion of a reflective object in an underwater environment as recited in claim 18, further comprising a resistor, connected in series with the input of said means for emitting, for adjusting the power of said means for emitting.

20. An apparatus for sensing motion of a reflective object in an underwater environment as recited in claim 18 further comprising:

means, connected in series with the positive and negative voltage supply lines of said means for generating and supplying, for reducing noise from said means for generating and supplying, said means for reducing noise comprising a second resistor connected in series with the positive voltage supply line and a first capacitor connected across the positive voltage supply line of said means for generating and supplying, said means for reducing noise further comprising a third resistor connected in series with the negative voltage voltage supply line and a second capacitor connected across the negative voltage supply line of said means for generating and supplying.

* * * * *